No. 706,033. Patented Aug. 5, 1902.
D. I. DAVIS.
APPARATUS FOR WASHING FAT.
(Application filed Feb. 1, 1902.)

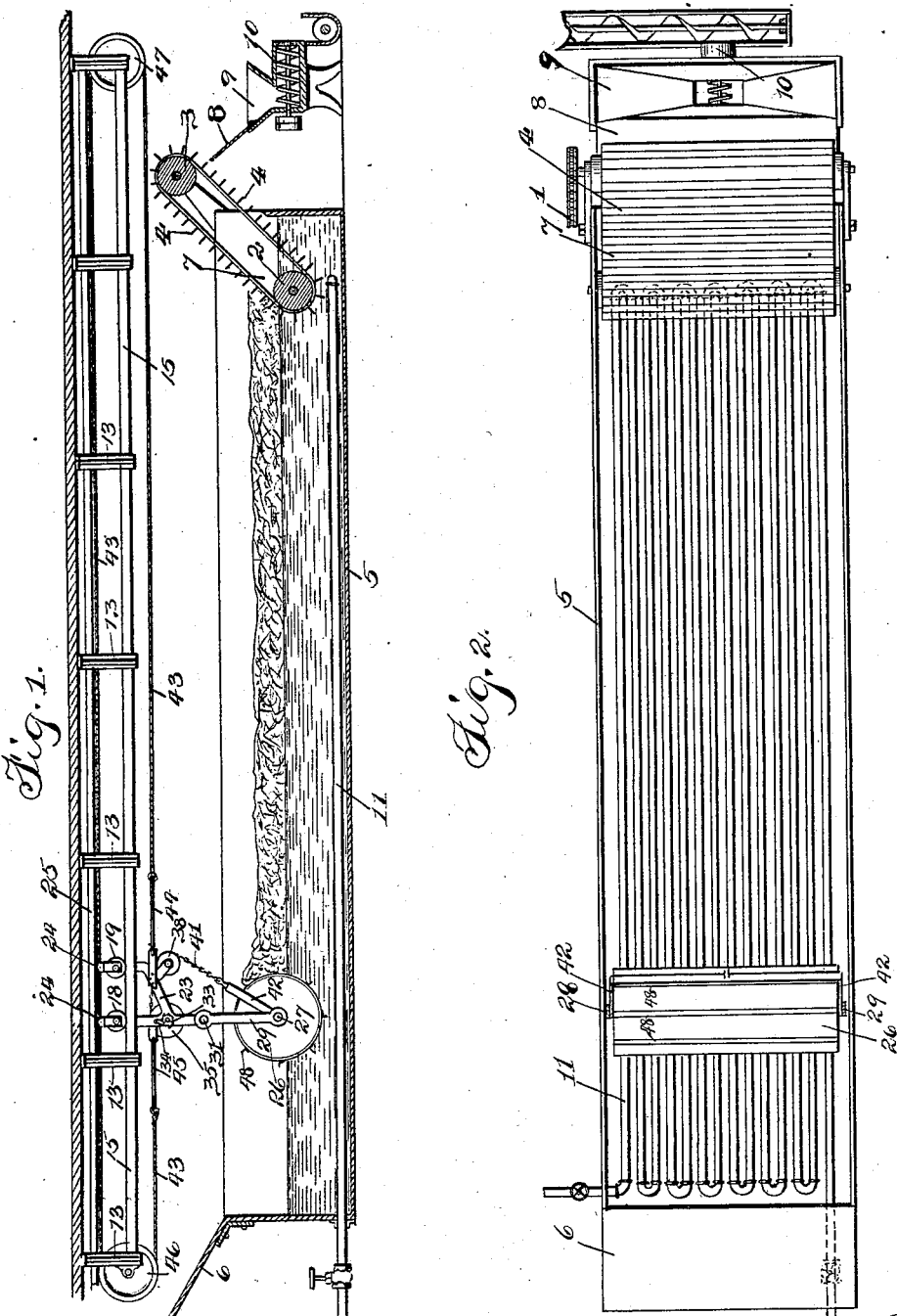

(No Model.) 2 Sheets—Sheet 2.

Witnesses:
J. B. Weir
F. D. Perry

Inventor:
David I. Davis
by Bond Adams Pickard Jackson
his Att'ys

UNITED STATES PATENT OFFICE.

DAVID I. DAVIS, OF KANSAS CITY, KANSAS, ASSIGNOR TO SWIFT AND COMPANY, OF CHICAGO, ILLINOIS, A CORPORATION OF ILLINOIS.

APPARATUS FOR WASHING FAT.

SPECIFICATION forming part of Letters Patent No. 706,033, dated August 5, 1902.

Application filed February 1, 1902. Serial No. 92,093. (No model.)

*To all whom it may concern:*

Be it known that I, DAVID I. DAVIS, a citizen of the United States, residing at Kansas City, in the county of Wyandotte and State of Kansas, have invented certain new and useful Improvements in Apparatus for Washing Fat, of which the following is a specification, reference being had to the accompanying drawings.

My invention relates to apparatus for washing and cooling fatty matter, such as caul-fat derived from the carcasses of animals in slaughter-houses.

It has for its object to provide mechanism by which such fatty matters may be readily, effectually, and quickly washed and cooled.

To this end my invention, generally stated, consists in providing a tank, adapted to contain the fat to be treated, with mechanism adapted to traverse the tank and submerge and agitate the fat floating on the water therein contained, thereby subjecting all parts of the fat to the action of the water in the tank, so that any impurities contained may be washed out.

My invention further consists in providing agitating or submerging mechanism so constructed that it serves also as a means for delivering the fat to the discharge end of the tank. It also consists in providing means operating in connection with said agitating and submerging mechanism for discharging the fat from the tank.

More specifically, my invention consists in providing the washing-tank with a traveling drum adapted to rotate, said drum being arranged to roll over the fat as it moves in the tank, submerging the fat by its weight and agitating it in contact with the water as the drum rotates.

It further consists in providing means by which the drum may be dipped to a greater or less extent in the water, so as to gather up the fat in advance of it as it moves, thereby carrying the fat along to the opposite or discharge end of the tank; also, in combining such mechanism with a conveyer arranged to carry the fat up out of the tank.

My invention also involves certain other specific features of construction, which will be hereinafter pointed out.

That which I regard as new will be set forth in the claims.

Figure 3:
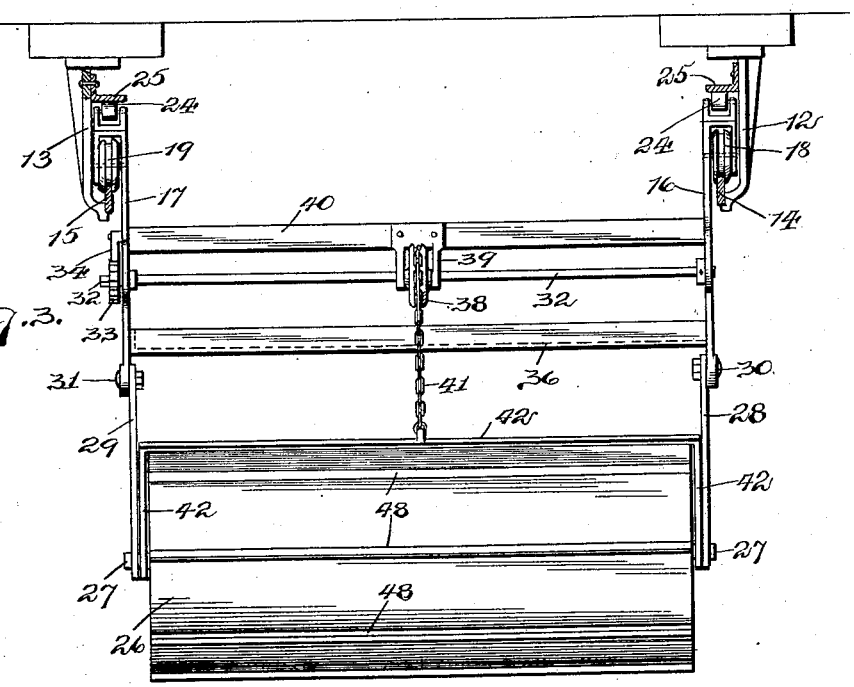
Figure 4:
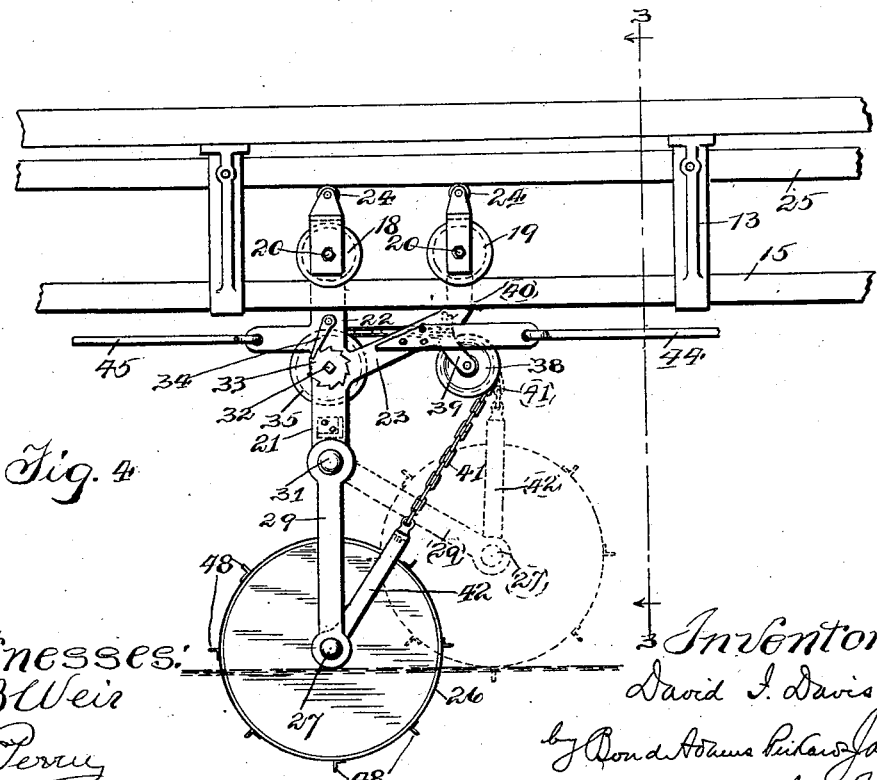

Referring to the drawings, Figure 1 is a partial sectional view of a building, illustrating my improved mechanism. Fig. 2 is a plan view of the tank, showing the cylinder. Fig. 3 is an enlarged detail, being a vertical cross-section on line 3 3 of Fig. 4; and Fig. 4 is a side elevation of the cylinder and supporting devices therefor.

In the drawings, 5 indicates the washing-tank, which, as illustrated in Fig. 1, is an elongated box having an inlet-chute 6 at one end and an inclined conveyer 7 at the other end extending down into the water for the discharge of fat. Said conveyer may be of any approved construction suitable for the purpose. In the drawings I have shown it as consisting of an endless belt mounted on rollers 2 3, said belt being provided with a series of flights 4, arranged to take the fat and carry it up out of the tank. The conveyer 7 is driven by a chain 1, which may in turn be driven from any suitable source of power. A deflector 8 connects with the conveyer and is adapted to deliver the fat into the hopper 9 of a grinding-mill 10 or into any other receptacle placed to receive it. The tank 5 is usually filled with water to a point somewhat above the lower end of the conveyer 7, and the bottom of the tank is covered to a greater or less extent with pipes 11, adapted to contain a cooling fluid for keeping the water in the tank cool.

12 13 indicate hangers which depend from the ceiling above the sides of the tank. The hangers 12 carry a rail 14 and the hangers 13 support a rail 15, as shown in Figs. 3 and 4. The rails 14 15 are parallel and in the same horizontal plane and serve to support the side frames 16 17, respectively, of a carriage, from which the immersing and delivering drum is supended, as will be hereinafter described. Each of the side frames 16 17 is provided with two wheels 18 19, which run on the rails 14 15, said wheels being mounted upon suitable spindles 20, as shown in Fig. 4. The side frames 16 17 are best made Y-shaped, as shown in Fig. 4, there being a depending arm 21 and two arms 22 23, respectively, which project upward from the point of union of the three arms, the arms 23 extending at an angle to the arms 21 22. The three arms of the side frames are preferably made in one piece, as shown in Fig. 4.

24 indicates guide-rollers mounted in the upper ends of the arms 22 23 and adapted to bear against guide-rails 25, secured to the hangers 12 13, as shown in Fig. 1. Said rollers 24 serve to prevent the wheels 18 19 from leaving the track.

26 indicates a drum or cylinder, the length of which is about equal to the width of the tank, said drum being made water-tight and being mounted on a shaft 27, fitted in bearings at the lower ends of straps 28 29, which are pivoted at 30 and 31, respectively, to the depending arms 21 of the side frames 16 17. (See Figs. 3 and 4.)

32 indicates a shaft which is mounted at its ends in the side frames 16 17, as best shown in Fig. 3, preferably at the points of union of the three arms thereof. One end of the shaft 32 projects beyond the side frame 17, as shown in Fig. 3, and is squared to receive a crank, so that it may be rotated readily. It also carries a ratchet-wheel 33, adapted to be engaged by a pawl 34, mounted on the side frame 17, as shown in Fig. 4.

35 indicates a pulley mounted on the shaft 32, preferably centrally thereof.

36 indicates a brace which connects the side frames 16 and 17.

38 indicates a second pulley, carried in a yoke 39, secured to a brace 40, which connects the arms 23 of the side frames 16 17, as best shown in Figs. 3 and 4. The pulley 38 is in alinement with the pulley 35, both of said pulleys being grooved to receive a chain 41 or other flexible connection. One end of the chain 41 is permanently secured to the pulley 35, and the chain then passes over said pulley to pulley 38, over which it passes. It then extends downward and connects with a bail 42, the ends of which are connected to the shaft 27, which carries the drum 26, as best shown in Figs. 3 and 4. As shown in Fig. 4, the bail 42 is thereby held at a greater or less angle with the straps 28, the shaft 27 of the drum normally lying in the same vertical plane as the pivots 30. By winding up the chain 41 on the pulley 35, however, the drum may be carried laterally, as indicated by dotted lines in Fig. 4, thereby raising the drum as it swings on the straps 28 about the pivots 30. The pawl 34 and ratchet-wheel 33 serve to lock the drum in any position to which it is raised.

The drum-supporting carriage is moved from end to end of the tank by means of a cable 43, the ends of which are connected to bails 44 45, connected, respectively, to the arms 23 and 22 of the side frames 16 17, said cable passing around pulleys 46 47, suitably mounted at points beyond the ends of the tank, as shown in Fig. 1. The cable 43 thus is, in effect, an endless belt and may be moved in either direction to carry the drum back and forth in the tank. The cable may be operated either by hand or by power applied to the shaft upon which one or the other of the pulleys 46 47 is mounted.

48 indicates a series of ribs which project radially from the drum 26. These are best formed by securing angle-irons upon the periphery of the cylinder, said angle-irons extending from end to end of the cylinder, as shown in Fig. 3.

The operation of the apparatus is as follows: The tank being filled with water to about the level indicated in Fig. 1 the fat is fed into the tank from the chute 6 and floats upon the surface of the water. The drum 26 is raised high enough so that it rolls freely upon the mass of fat and is then caused to travel from one end of the tank to the other, being moved back and forth as many times as may be desired. As the drum is moved along its ribs 48 engage the fat, so that it rolls instead of slides upon the fat, and as it passes over the fat the weight of the drum forces the fat down into the water and agitates it, so that it is thoroughly exposed to the action of the water, being purified and cooled thereby. When the fat has been treated sufficiently, the drum is moved to the inlet end of the tank and lowered to about the position shown in Fig. 1. This is accomplished by unwinding the chain 41 from the pulley 35. The drum is then moved slowly to the opposite end of the tank, and thereby pushes the mass of fat toward the outlet end of the tank, forcing it against the inclined conveyer 7, by which it is carried up out of the tank and discharged upon the deflector 8. During this operation the drum does not rotate materially, since the resistance of the fat is applied to a great extent radially to the drum. Moreover, the ribs 48, which are immersed in the water, impede rotation of the drum by their engagement with the water. The ribs that are out of the water aid in preventing the fat from riding over the drum.

While I have described the specific embodiment of my invention illustrated in the accompanying drawings, I wish it to be understood that it is not restricted to the specific details of construction shown and described except in so far as such details are particularly claimed.

That which I claim as my invention, and desire to secure by Letters Patent, is—

1. An apparatus of the class described, consisting of a tank, a carriage, means suspended from said carriage adapted to engage and submerge the fat, and means for operating said carriage to carry said submerging means across the tank, substantially as described.

2. An apparatus of the class described, consisting of a tank, a carriage, rotary mechanism suspended from the carriage adapted to engage and submerge the fat, and means for operating said carriage to carry said rotary mechanism across the tank, substantially as described.

3. An apparatus of the class described, consisting of a tank, a rotary drum, and traveling means supporting said drum and adapted to conduct it across the tank, substantially as described.

4. An apparatus of the class described, consisting of a tank, a rotary drum, and traveling means supporting said drum and adapted to conduct it across the tank, said drum having ribs on its periphery, substantially as described.

5. An apparatus of the class described, consisting of a tank, a rotary drum, traveling means supporting said drum and adapted to conduct it across the tank, and means for adjusting the height of the drum, substantially as described.

6. The combination of a tank, a carriage, a submerging device suspended from said carriage and adapted to engage and submerge matter floating on the water in the tank, and means for vertically adjusting said submerging device, substantially as described.

7. The combination of a tank, a carriage, a rotary submerging device suspended from said carriage and adapted to engage and submerge matter floating on the water in the tank, and means for vertically adjusting said submerging device, substantially as described.

8. The combination of a tank having an inclined conveyer at one end, a submerging device movable across the tank and adapted to engage and submerge matter floating on the water in the tank, and means for vertically adjusting said submerging device, substantially as described.

9. The combination of a tank having an inclined conveyer at one end, a rotary drum movable across the tank and adapted to engage and submerge matter floating on the water in the tank, and means for vertically adjusting said rotary drum, substantially as described.

10. The combination of a tank having an inclined conveyer at one end, a rotary drum movable across the tank and adapted to engage and submerge matter floating on the water in the tank, and means for vertically adjusting said rotary drum, said drum having radial ribs on its surface, substantially as described.

11. In an apparatus of the class described, the combination of a tank adapted to contain water, means for cooling the water in the tank, and means for submerging matter floating on the surface of the water in the tank, substantially as described.

12. In an apparatus of the class described, the combination of a tank adapted to contain water, and traveling means adapted to submerge matter floating on the water in the tank, substantially as described.

13. The combination of a tank, a carriage, a rotary drum pivotally suspended from said carriage and adapted to engage and submerge matter floating on the water in the tank, means for moving said carriage to cause said drum to travel across the tank, and means for vertically adjusting said drum, substantially as described.

14. The combination of a tank, a carriage having pulleys 35 38, a rotary drum, straps pivotally suspending said drum from said carriage, and means for angularly adjusting said straps, to raise or lower the drum, substantially as described.

15. The combination of a tank, a carriage, pulleys 35 38 carried by said carriage, and a flexible connection extending over said pulleys and connected with said drum for raising or lowering said drum, substantially as described.

16. The combination of a tank, a submerging device movable across the tank and adapted to engage and submerge matter floating on the water in the tank, means for vertically adjusting said submerging device, and means for discharging the matter floating on the water in the tank, substantially as described.

17. In an apparatus of the class described, the combination of a tank adapted to contain water, and traveling means adapted to overlie and submerge matter floating in the water in the tank, substantially as described.

18. In an apparatus of the class described, the combination of a tank adapted to contain water, traveling means movable through the water in the tank, such traveling means acting as it moves through the water in the tank to submerge matter floating therein, substantially as described.

19. In an apparatus of the class described, the combination of a tank adapted to contain water, and means arranged to travel over matter floating in the water in the tank, for submerging such floating matter, substantially as described.

DAVID I. DAVIS.

Witnesses:
F. H. MANDOS,
R. W. ALEXANDER.